Sept. 27, 1932.  A. WRIGHT ET AL  1,880,005
FILTER CAKE TREATING DEVICE
Filed June 12, 1926   2 Sheets-Sheet 1
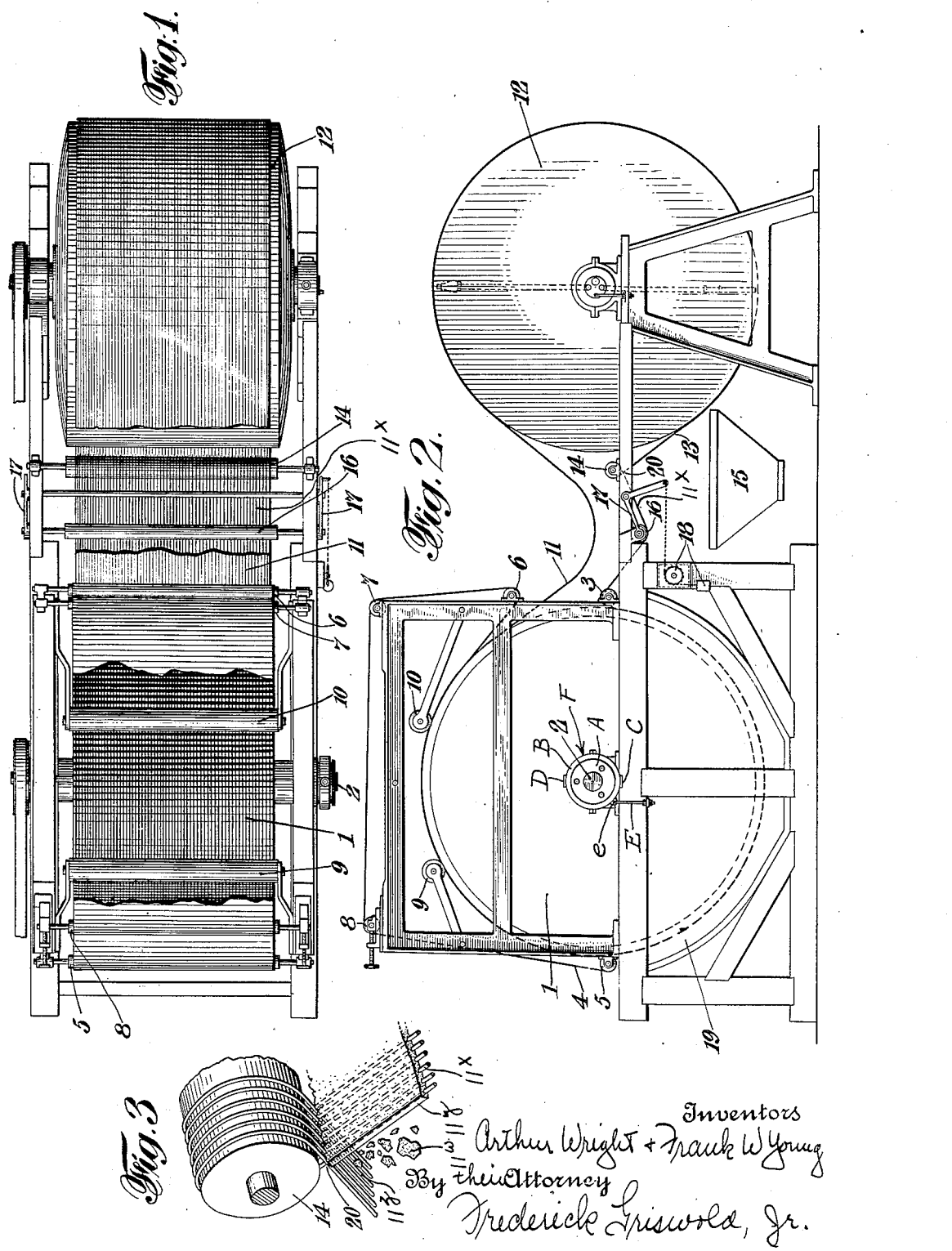

Sept. 27, 1932.   A. WRIGHT ET AL   1,880,005
FILTER CAKE TREATING DEVICE
Filed June 12, 1926   2 Sheets-Sheet 2
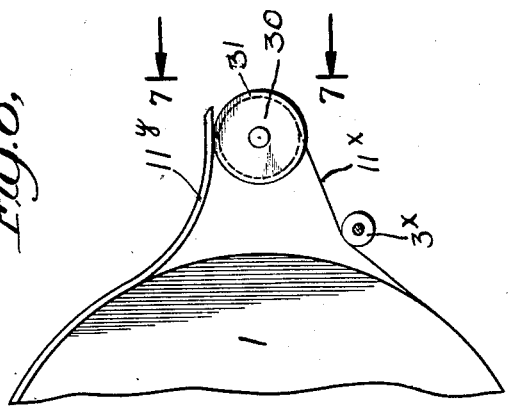
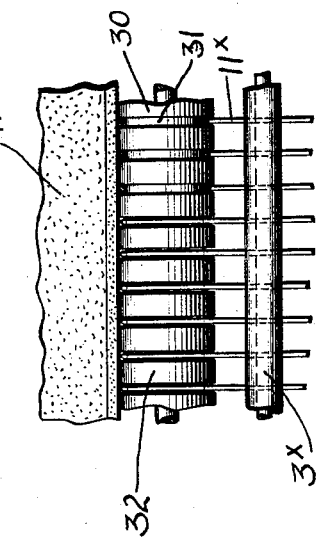
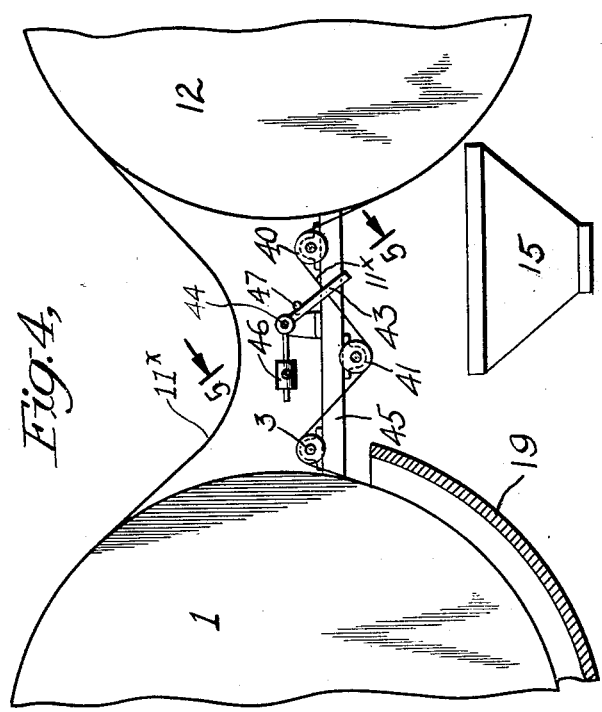
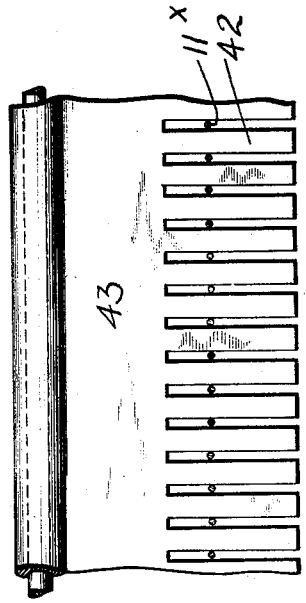
Inventors
Arthur Wright + Frank W Young
By their Attorney
Frederick Griswold, Jr.

Patented Sept. 27, 1932

1,880,005

UNITED STATES PATENT OFFICE

ARTHUR WRIGHT, OF UPPER MONTCLAIR, AND FRANK W. YOUNG, OF VERONA, NEW JERSEY

FILTER CAKE TREATING DEVICE

Application filed June 12, 1926. Serial No. 115,481.

This invention has to do broadly with improvements in and relating to the separation of solids from a liquid within which such solids are suspended and the subsequent drying of the separated solids. More particularly, the invention relates to improvements in filtration through the instrumentalities of rotary type filters and has especial reference to the facilitation of the removal of filter cake from the filters and the subjection of the same to subsequent and further drying.

In some arts it has been the practice to provide a rotating drum, partially submerged in a tank of liquor, in which finely divided matter is held in suspension, and to induce a migration of the suspended particles toward the drum and a deposit thereon of the particles. For instance, in filtration, suction applied within the drum has caused the passage of filtrate through a filtering medium lying upon the surface of the drum and a cake formed by deposit of solids on the filtering medium has been removed therefrom by scrapers at a convenient point in the rotation of the drum. In the patent to the present applicants granted October 30, 1923, No. 1,472,574 cake is disclosed as removed from a surface upon which it has been formed by means of a re-enforcing and stripping medium about which in one embodiment, the cake forms in the filtering zone, thus obviating the necessity of scrapers. Movement of the drum causes the filter cake to occupy the position at which it is ordinarily scraped from the filtering medium and at which point the vacuum, which has been drawing through the cake to dry it, is released. At this point the reinforcing and stripping member, which is in the form of an endless belt, is led away from the drum and carries therewith the filter cake. The type of re-enforcing medium therein disclosed involved a mesh re-enforcement or the like, from which the cake was removed by wetting or vibration.

One object of the present invention is to provide an improvement in cake re-enforcing media to the end that certain advantages may be attained which are not possible with the patented construction. Accordingly, the cake is re-enforced by a plurality of substantially separate, preferably endless, cake re-enforcing members adapted to pass partly around the peripheral surface of a drum upon which a deposit of solids is induced, which builds up in the form of a cake about the said members and is re-enforced thereby.

Further, the invention has to do with a convenient, simple and expeditious drying of the cake after its removal from the surface upon which it is formed. The re-enforcing medium is therefore directed about a rotatable drum, internally heated in any convenient manner, by which volatile constituents of the cake carried by the re-enforcing medium may be driven off to any desired degree.

The invention also seeks to automatically free the re-enforcing members of the solids carried thereby. To this end devices are introduced between the respective members and upon relative motion between the said devices and the members they are freed of their burden of cake. One means of accomplishing this aspect of the invention is to pass the members between the teeth of a comb-like device to effect a dislodgment of the cake from the re-enforcement. Another means of stripping the re-enforcing members according to this aspect of the invention is to cause the members to pass around a roller, as in the form of a loop, and to cross themselves in contact, or nearly so, at an angle whereby the contact with the cake of an oppositely moving portion of each strand causes the separation of the cake adhering to one portion. The cake may also be stripped from the re-enforcing members by passing said members about a grooved roller, the grooves of which receive the members and the surfaces or landes of the roller between the grooves entering the spaces between the members deflect the cake therefrom.

Still another object of the invention is the combination of all of the features hereinbefore described into a continuously operating filtering and drying system which is extremely practical in industrial filtration since it commences with a slurry of solids and liquids and delivers a clarified liquid at one point and solids dried to the desired degree at another.

In carrying out this aspect of the invention use is made of a rotary drum filter which in the practice of the process may be of any well known type, and a rotary drum, heated in any suitable manner and serving as a drying member for the filter-cake formed by the action of the filter drum. A number of separate endless cake re-enforcement members are shown as passing partly around the peripheral surface of the filter drum, thence from that drum and partly around the peripheral surface of the drying drum. As these members leave the drying drum they are individually freed of the cake carried by them, as by the interposition of a member in contact with the cake. This result may be obtained by causing the members to pass around a small roller. The members may cross themselves at an angle. They then pass over a spacing device and onto the filter drum.

As the endless members pass around the filter drum and consequently through the cake-forming zone, the filter-cake is built up around or upon the various members and is re-enforced or made conveyable thereby. After the filter-cake has been removed from the filter drum by the movement of the re-enforcing members, and, if desired, dried by the drying drum, it is stripped from the re-enforcing members, say, by the crossing of those members and the resultant rubbing of members freed from filter-cake against the cake on members encumbered therewith. Obviously, either of the other stripping devices described could be availed of, also.

A more comprehensive understanding of the features and advantages of the present invention may be had from the following description taken in connection with the accompanying drawings wherein is illustrated a preferred embodiment of the same, in which:

Figure 1 is a plan view showing a rotary drum filter and a rotary drying drum provided with a filter-cake re-enforcing medium in accordance with this invention, certain overlying parts having been removed in the interest of clearness.

Figure 2 is a view in side elevation showing the same machine.

Figure 3 is a detail view, in perspective, showing the roller and the re-enforcing members looped thereabout to form stripping means for cake.

Figure 4 is a view showing fragmentary portions of a filter drum and rotary dryer and a re-enforcing medium passing therebetween from which the cake is stripped by the comb-like stripping device.

Figure 5 is a view taken in the plane indicated by the line 5—5 in Figure 4, looking in the direction of the arrows, and showing, in front elevation, a fragmentary portion of the comb-like stripping device with the spaced re-enforcing members passing therethrough.

Figure 6 is a view showing a fragmentary portion of a drum upon which a deposit of solids has been induced in the form of a cake, the cake being removed by continuous spaced cake re-enforcing elements also passing about a cake stripping device comprising a roller, in spaced circumferential grooves of which the members lie.

Fig. 7 is a view of the parts shown in Fig. 5 taken at right angles thereto as shown by line 7—7 in Fig. 6.

While the invention has been illustrated and will now be described in connection with a rotary type filter it is to be understood that it is in nowise limited to such use but is equally applicable in any situation wherein solid particles are to be separated from a liquid in which they are suspended and subsequently handled and/or dried.

In the drawings there is illustrated, diagrammatically (Figures 1 and 2), a rotary drum type filter 1 supported by axle 2 in a tank 19 in which the drum is adapted to be partially immersed in liquid or plastic material contained therein. The filter provides an endless supporting surface having vacuum passages therein and a filtering cloth or other medium for separating solids from liquids is disposed over the passages. As in the patent, a cake is adapted to be formed upon the peripheral surface of the drum by a migration thereto of solid particles suspended in the liquid and this cake is adapted to be removed from the surface of the drum continuously by a re-enforcing medium. As the drum is rotated and the particular portion of the filter cake approaches that point at which it is to be removed from the filter medium, the vacuum is relieved. The re-inforcing and stripping member is at this point lead away from the filter medium and, being embedded within the filter cake, accordingly strips it from the filter medium and provides for its transportation to a suitable apparatus for its further treatment. According to the present invention the re-enforcing medium comprises a plurality of spaced substantially, independent and preferably unconnected and preferably parallel strands or cords 11$^x$ which are laid or disposed upon the endless supporting surface of drum 1 by a roll 3 formed in its surface with a plurality of annular grooves in which the strands or cords lie, respectively, and by which they are guided into desired relation with or disposed upon the surface or filtering cloth of the filter drum.

The strands 11$^x$ may be formed of any suitable material, metallic or non-metallic, which will be unaffected by the contents of the tank 19 and posses the necessary durability. For instance, any fibrous cord or string, say of hemp, linen, jute or the like, may be availed of. These strands are positioned so that they lie almost in contact with one another or they may be spaced further apart. The size of the strands and the distance apart at which they are to be spaced on the surface of the drum, depends upon the characteristics of the cake which it is desired to re-enforce with the web 11.

It is not intended that the filter-cake reenforcing medium according to the present invention shall form a part of the filtering medium, nor in any way retard the passage of filtrate therethrough. It is contemplated, however, that the re-enforcing medium shall lie in the cake-forming zone of the filtering medium, and, as the cake is drawn to and forms on the surface of the filtering medium in a substantially unitary mass, during the rotation of the drum, that it shall form between and surround the strands of the reenforcing medium so that they shall be wholly embedded therein before the rotation of the drum shall have terminated the filtering period. Theoretically, of course, when the strands are applied to the filtering medium before filter cake is formed therein, a transverse element of the cylindrical surface of the filter medium is tangent to the strand. Thus, theoretically, filter cake would form wholly about the strand except where the strand meets the filtering medium on a line contact. Practically, however, as the strand and/or the filtering medium has some capacity for distortion, the contact between the filtering medium and the strand is greater than a line contact and the strand is exposed or not covered with or embedded in cake at that portion where it contacts with the filtering medium when the cake forms thereabout.

As in the previously patented construction a pressing belt or band 4 passes over the top of the drum from the roll 5 to the roll 6 and under that roll and returns over rolls 7 and 8 to the starting point, pressing upon the outer surface of the plastic material whereupon the cake is compressed, rendered homogeneous and less porous and accordingly more firmly anchored or pressed to the reinforcing and stripping member after the strip 11 has passed through the tank. Further, considerable of the excess liquid will be removed from the cake and drawn into the drum as the vacuum is still maintained on the compartments directly under the compression apparatus. As the drum is rotated and the particular portion of the filter cake approaches that point at which it is to be removed from the filter medium, the vacuum is relieved, through the instrumentality of any well known type of filter valve, as in standard practice, since without the relief of the vacuum the filter cake will be held to the cloth by the vacuum with greater force than the reenforcement of the reenforcing members. . Such a vacuum control valve, adapted selectively to subject the plastic material on the periphery of the drum 1 to different degrees of subatmospheric pressure, is indicated at A, B, in Figure 2. The filtrate collecting ring is shown at B. This ring B is a controlling member and regulates the application of the vacuum to the various compartments of the filter drum and the break off of the vacuum as each compartment reaches the point of discharge of the cake. The drain lines or vacuum passages leading from the vacuum passages in the supporting member and beneath the filter cloth terminate in the controlling member A within or beneath this collecting ring B which is relatively rotatable with respect to the part A and serves as an adjustable connection between the said vacuum passages and sources of the different degrees of sub-atmospheric pressure, to wit, the high and low vacuum. The low vacuum source is in communication with and maintained in one chamber in the valve ring B by the pipe connection C and the high vacuum source is in communication with and maintained in another chamber in the valve ring B by the pipe connection D. The adjustment of the valve ring for the purpose of determining where filtration begins and where the filter cake is subjected to a higher vacuum beneath the compressor belt, say, for the purpose of drawing excess liquid out of the plastic article $11^y$ and where discharge is effected is obtained by the adjusting or valve anchor rod E adjustably secured at its one end to a plate on the slurry tank 19 and connected at its other end to ears $e$. The vacuum release or air vent is not visible in the front elevation of Figure 2 since it is merely an aperture in the peripheral surface of the collecting ring and is not required to be shown as such vacuum release as well as the other functions of the valve are standard practice. This particular valve illustrated forms the subject matter of a copending Patent No. 1,872,209.

Additional rolls 9 and 10 compress the filter-cake as it passes over the top of the filter drum. When one rotation of the filter drum has been nearly completed, that is, after a further predetermined movement when the pressure of the belt 4 is relieved, the reenforcing medium, bearing with it the filter-cake (now compressed and somewhat freed of liquid), is gently broken away from the filtering medium proximate the roll 6, and, as shown at 11, may be transferred to a heated drying drum 12 about which the strands also pass where the cake may be further freed of entrained fluid. At the point 13 the reenforcing medium leaves the surface of the drying drum and passes under a small idler roll 14, thence (as seen in Figures 2 and 3) around roll 14 in a clockwise direction, and thence once more under roll 14 and is stripped of its burden of cake before again traveling about the filter drum. The stripping of the cake is effected by the intervention of elements between the respective re-enforcing members, there being relative movement between the elements and members. One means of stripping the cake from the strands is illustrated in Figures 1 and 3. Directly under roll 14 at point 20 the strands leaving roll 14 intermesh alternately with the strands approaching roll 14. There is thus provided, at point 20, an automatic or self-contained stripping action wherein the solid cake $11^y$ (Figure 3) adhering to the strands is broken away and stripped therefrom by the frictional or cutting action or engagement with the cake of a further traverse of the same strands as at $11^z$ from which the filter-cake has already been removed in a similar manner. A hopper 15 is suitably disposed below the point of crossing or contact of the strands to catch the broken filter-cake $11^w$ as it becomes disengaged from the re-enforcing medium.

After the strands are thus stripped they pass, still in parallelism, under an idler roll 16 supported at both ends by pivoted arms 17, which in turn are connected in any usual fashion as suggested diagrammatically by the wheel and weight 18 to control the speed of the driving means attached to shaft 2. From the roll 16, the parallel strands are returned to the grooves in the guide roll 3 from which they continue in repetition of the cycle above set forth. The speed control mechanism actuated by the idler roll 16 is so arranged that when the speed of rotation of the drum filter becomes too great, the tension upon the strands constituting cake re-enforcing means tends to raise the roll 16 and thus, through the pivoted arm 17 and the wheel and weight device 18 coupled with a suitable rheostat (not shown) serves to reduce the speed of the driving means actuating the rotary drum 1. The rotary filter 1 is operated at constant speed by means not necessary to be shown, the variable speed element being the drying drum 12 controlled in the manner and by the means above set forth.

In situations where no drying of the cake formed on the drum is required cake stripping devices alone may be associated with a drum. Such a combination is illustrated in Figures 6 and 7 wherein strands $11^x$ passing about a rotating drum 1 are embedded within a cake $11^y$ formed in any manner upon the surface of the drum. To strip the cake, the strands are led away from the drum about a roller 30. If desired, the roller 30 may be formed with annular peripheral grooves 31 within which the strands are disposed, respectively. The portions or landes 32 of the roll between the grooves come between the strands and pry or shear off the cake. If desired, an idler roll $3^x$ may direct the strands back to the drum 1.

The deposit $11^y$ is displaced from the cords $11^x$ in a continuous sheet at the point where the strands are directed away from the path of movement of the cake.

A comb-like cake stripping device, between the teeth of which the strands pass, is shown in Figures 4 and 5. As in the previously described embodiment, the continuous re-enforcing medium extends about a drum 1 upon which cake is formed in any manner and about a drying drum 12. From the drum 12 the strands are conducted about an idler 40, thence to an idler 41 and from thence about the roll 3 which lays the strands in the desired relation upon drum 1 again. Between the rolls 40 and 41 the strands $11^x$ are directed between the teeth 42 of a comb-like stripping member 43, pivoted as at 44 on the frame 45. As the strands pass between the teeth, they are stripped of their burden of cake which falls into the hopper 15. An adjustable counterweight 46 determines the resistance of the teeth to the cake and hence the force availed of in deflecting it off the strands. If desired, a stop 47 may limit the pivotal movement of the comb under the influence of the counterweight.

It will thus be seen that a re-enforcing medium for a cake, no matter how formed, has been provided, which may be self-stripping or may be readily associated with automatic or self-contained stripping devices. Further a rotary drying drum has been associated with a cake forming instrumentality to effect a continuous drying of cake to a predetermined or desired degree.

The instrumentalities by which the re-enforcing and conveying members are freed of their burden of deposit will be determined in many instances by the character of the deposit to be handled. Thus, in some situations a comb-like stripping member will be resorted to while in others the members may be directed about a roll whereby the deposit will be displaced from the members as a continuous sheet at the point where the members are directed away from the direction of travel of the deposit.

It is to be understood that the invention, in all its aspects, is not limited to the precise instrumentalities illustrated as the re-enforcing medium nor to any particular configuration or composition thereof and further that the invention contemplates the use of certain of the component elements independently of others.

What we claim is:

1. A cake re-enforcement comprising a plurality of separate members about which the cake is formed.

2. A cake re-enforcement comprising a plurality of separate, endless, flexible members adapted to lie in the cake forming zone.

3. A filter cake re-enforcement comprising a plurality of spaced, separate, continuous, flexible strands adapted to lie adjacent the filtering medium in the cake forming zone and about which the cake is formed.

4. The combination with a cake forming instrumentality of a self-stripping cake re-enforcement and means whereby the re-enforcement rids itself of the cake.

5. The combination of a cake forming instrumentality, of a plurality of independent flexible strands in the cake forming zone about which the cake is formed.

6. The combination of a cake forming instrumentality comprising a rotary drum, and a plurality of independent flexible strands encircling the periphery of said drum in the cake forming zone and about which the cake is formed.

7. The combination of a cake forming instrumentality comprising a rotary drum, of a plurality of independent flexible strands encircling the periphery of said drum in the cake forming zone and about which the cake is formed, and means to cause the passage of strands from which cake has been stripped through the path of travel of strands to which cake is adhering.

8. The combination of a rotary drum filter and a filter cake re-enforcement composed of a plurality of separate endless members adapted to form a nucleus for the filter-cake.

9. The combination of a rotary drum filter, a plurality of separate, flexible strands encircling the drum and lying in the cake forming zone and about which the filter cake is formed and means including relatively movable elements to separate the cake from the strands.

10. The combination of a rotary drum filter, a filter-cake re-enforcing medium adapted to travel with the filter-cake, and means for causing the re-enforcing medium to travel through a path having parts which intersect.

11. The combination of a rotary drum filter, a rotary drying drum, a filter-cake re-enforcing medium adapted to be driven by contact with each, means for driving one of said rotating elements at constant speed, and means for driving the other of said elements at a speed determined by the tension of said re-enforcing medium between said filter and said drying drum.

12. The combination of a rotary drum filter, a rotary drying drum, a filter-cake re-enforcing medium adapted to be driven by contact with both, means for driving one of the rotating elements at constant speed, a roller adapted to be moved laterally with respect to its axis by the tension of the re-enforcing medium and means variedly controlled by the lateral movement of said roller to drive the other of said rotating elements.

13. The combination of a rotary drum filter, a filter-cake re-enforcing medium and means for causing the plane of travel of said medium to intersect at parts of its traverse whereby said medium will be stripped of the filter-cake adhering thereto.

14. The combination of a filter-cake re-enforcement comprising a plurality of separate endless members adapted to lie adjacent to the filtering medium in spaced relation to each other, and means for determining said spaced relation.

15. The combination of a cake forming instrumentality, a plurality of independent, flexible strands, and a roller formed with peripheral grooves within which the strands lie, respectively.

16. The combination with a rotary drum filter, a roller formed with peripheral grooves and a plurality of independent, flexible, continuous strands encircling the drum and the roller and disposed within the grooves.

17. In combination, a rotary drum type filter, a heated drum and a filter cake re-enforcement comprising a plurality of separate, endless strands encircling the filter and the drum.

18. In combination, a rotary drum type filter, a heated drum, a filter cake re-enforcement comprising a plurality of separate endless strands encircling the filter and the drum, and means to strip the cake from off the strands.

19. In combination, a rotary drum type filter, a heated drum, a filter cake re-enforcement comprising a plurality of separate, endless strands encircling the filter and the drum, and means to strip the cake from off the strands comprising passing portions of the strands from which filter cake has been stripped through the plane of travel of the strands burdened with cake.

20. In combination, a rotary cake forming instrumentality, a rotary drying drum, and means to convey cake from said instrumentality to the drum comprising separate endless strands encircling the instrumentality and the drum.

21. In combination, a rotary cake forming instrumentality, a rotary drying drum, means to convey cake from said instrumentality to the drum comprising separate endless strands encircling the instrumentality and the drum, and means to strip the cake from off the strands.

22. In combination, a rotary cake forming instrumentality, a rotary drying drum, means to convey cake from said instrumentality to the drum comprising separate endless strands encircling the instrumentality and the drum, and means to strip the cake from off the strands comprising passing portions of the strands from which filter cake has been stripped through the plane of travel of the strands burdened with cake.

23. In combination, a rotary type filter, a rotary heated drum, a filter cake re-enforcement comprising a plurality of endless strands encircling the filter and drum, and means to strip the cake from the re-enforcement comprising elements interposed between the strands and means to effect relative motion between strands encumbered with cake and the elements interposed therebetween.

24. In combination, a rotary type filter, a rotary heated drum, a filter cake re-enforcement comprising a plurality of endless strands encircling the filter and drum, and means to strip the cake from the re-enforcement including teeth interposed between the strands.

25. In combination, a cake forming instrumentality, a rotary drying drum, means to convey cake from said instrumentality to the drum comprising spaced strands and means to compress the cake before it leaves said instrumentality.

26. In combination, a cake forming instrumentality, a rotary cylindrical heated element, and means including spaced strands to convey cake from said instrumentality into contact with the heated element.

27. A machine of the character described, comprising means forming an endless supporting surface having vacuum passages therein, filtering cloth disposable over said passages, endless cords disposable on said cloth, and a plastic material tank through which said endless members may pass when in cooperation with each other, whereby material will be drawn to said endless members in a unitary mass.

28. A machine of the character described, comprising a rotatable supporting drum having vacuum passages therein, filtering cloth disposable on the periphery of said drum to cover said passages, endless cords supportable on said filtering cloth over said vacuum passages and said filtering cloth, a tank having plastic material through which said cords and drum are movable, whereby the vacuum effects deposit of material over said vacuum passages and said cords, and means for pressing the outer surface of the plastic material on said drum after the same has passed through said tank.

29. A machine of the character described, comprising a rotatable supporting drum having vacuum passages therein, filtering cloth disposable on the periphery of said drum to cover said passages endless cords supportable on said filtering cloth and over said vacuum passages and said filtering cloth, a tank having plastic material through which said cords and drum are movable, whereby the vacuum effects deposit of material, to said drum over said vacuum passages and said cords, means for pressing the outer surface of the plastic material on said drum after the same has passed through said tank, and means for relieving said pressure action upon further predetermined movement of said drum.

30. A machine of the character described, comprising a rotatable supporting drum having vacuum passages therein, filtering cloth disposable on the periphery of said drum to cover said passages, an endless strip formed by a series of cords supportable on said filtering cloth and over said vacuum passages and said filtering cloth, a tank having plastic material through which said strip and drum are movable, whereby the vacuum will effect deposit of material to said strip, means for pressing the outer surface of the plastic material to said strip after the same has passed through said tank, means for relieving said pressing action upon further predetermined movement of said drum, and means for removing said strip from said drum periphery when the pressing action is relieved.

31. The combination of a drum upon which a cake or deposit is formed, reinforcing and conveying means comprising a plurality of spaced substantially individual, continuous, flexible strands encircling a portion of the periphery of the drum and about which the cake or deposit forms and means to discharge the cake or deposit from the strands.

32. The combination of a drum upon which a cake or deposit is formed, reinforcing and conveying means comprising a plurality of spaced substantially individual, continuous, flexible strands encircling a portion of the periphery of the drum and about which the cake or deposit forms and means to discharge the cake or deposit from the strands comprising a comb-like member between the teeth of which the strands pass after leaving the drum.

33. The combination of an instrumentality adapted to separate solids from liquids in which they are suspended comprising a rotary drum, reinforcing and conveying means for the solids separated from the liquid comprising a plurality of spaced substantially individual, continuous, flexible strands encircling a portion of the periphery of the drum and about which the solids build up in sheet-like form and means to discharge the solids from the strands.

34. The combination of an instrumentality adapted to separate solids from liquids in which they are suspended comprising a rotary drum, reinforcing and conveying means for the solids separated from the liquid comprising a plurality of spaced, substantially individual continuous flexible strands encircling a portion of the periphery of the drum and about which the solids form and means to discharge the cake from the strands comprising a comb-like member between the teeth of which the strands pass after leaving the drum.

35. The combination of an instrumentality for separating solids from liquids in which they are suspended comprising a rotary drum, reinforcing and conveying means for the solids separated from the liquid comprising a plurality of spaced substantially individual continuous flexible strands encircling a portion of the periphery of the drum and about which the solids build up in sheet form, guiding means about which the strands are directed during a portion of their travel away from the drum to thereby carry the sheet of solids away from the drum and means to discharge the solids from the strands before said strands return to the drum.

36. The combination of an instrumentality for separating solids from liquids in which they are suspended comprising a rotary drum, reinforcing and conveying means for the solids separated from the liquid comprising a plurality of spaced substantially individual continuous flexible strands encircling a portion of the periphery of the drum and about which the solids build up in sheet form, guiding means about which the strands are directed during a portion of their travel away from the drum to thereby carry the sheet of solids away from the drum and means to discharge the solids from the strands before said strands return to the drum comprising a comb-like member between the teeth of which the strands pass.

37. The combination of an instrumentality for separating solids from liquids in which they are suspended comprising a rotary drum, reinforcing and conveying means for the solids separated from the liquid comprising a plurality of spaced substantially individual continuous flexible strands encircling a portion of the drum and about which the solids build up in sheet form, a guiding roller spaced from the drum about which the strands travel to thereby carry the sheet of solids away from the drum and means to discharge the solids from the strands before said strands return to the drum.

38. The combination of an instrumentality for separating solids from liquids in which they are suspended comprising a rotary drum, a container for the solids in suspension and in which the drum rotates, reinforcing and conveying means for the solids separated from the liquid comprising a plurality of spaced substantially individual continuous flexible strands encircling a portion of the periphery of the drum and about which the solids build up in sheet form and means to discharge the solids from the strands.

39. In combination, an instrumentality for separating solids from liquids in which they are suspended comprising a rotary drum, a rotary drying drum, reinforcing and conveying means for the solids separated from the liquid comprising a plurality of spaced substantially individual continuous flexible strands encircling portions of the peripheries of the respective drums and about which strands the solids build up in sheet form in contact with the first named drum and means to discharge the solids from the strands during their passage from the drying drum to said first named drum.

40. In combination, an instrumentality for separating solids from liquids in which they are suspended comprising a rotary drum, a rotary drying drum, reenforcing and conveying means for the solids separated from the liquid comprising a plurality of spaced substantially individual continuous flexible strands encircling portions of the peripheries of the respective drums and about which strands the solids build up in sheet form in contact with the first named drum and means to discharge the solids from the strands during their passage from the drying drum to said first named drum comprising a comb between the teeth of which the strands pass.

41. In combination, an instrumentality for separating solids from liquids in which they are suspended comprising a rotary drum, reenforcing and conveying means for the solids separated from the liquid comprising a plurality of spaced substantially individual continuous flexible strands encircling a portion of the periphery of the drum and about which the solids build up in sheet form, guiding means about which the strands are directed during a portion of their travel away from the drum to thereby carry a sheet of solids away from the drum and means to give the strands a predetermined spacing with respect to one another.

42. The combination of a rotary drum filter, a filter cake reenforcing medium comprising a plurality of substantially spaced individual continuous flexible strands encircling a portion of the filter drum and about which the filter cake builds up in sheet form in the cake forming zone, rotating means about which the strands are directed during a portion of their travel away from the drum to thereby carry the sheet of cake away from the drum and means to discharge the cake from the strands before returning to the filter drum.

43. The combination of a rotary drum filter having a filtering medium on its surface upon which medium a deposit is formed, a filter cake reenforcing medium comprising a plurality of substantially spaced individual continuous unconnected flexible strands encircling a portion of the filter medium and positioned relatively to the medium and drum so that the filter cake builds up about the strands in sheet form in the cake forming zone, rotating guiding and cake discharging means spaced from the filter drum and about which the direction of the strands is changed during a portion of their travel away from the drum whereby the cake is discharged from the strands before returning to the filter drum.

44. A machine of the character described, comprising means forming an endless supporting surface having vacuum passages therein, filtering cloth disposable over said passages, endless unconnected cords disposable on said cloth, a plastic material tank through which said endless supporting surface and cords may pass when in co-operation with each other whereby material will be drawn to said members in an unitary mass and means for removing said cords from said filtering cloth after the mass is formed while preserving its shape.

45. In combination with a rotary drum-type filter having a filtering medium on its surface, a filter cake reenforcing and conveying member comprising a solitary flexible strand partly encircling the filter and disposed on the filter medium in the cake forming zone and about which filter cake forms, means spaced from the filter directing the strand away from the filter drum with filter cake thereon, and means to separate the cake from the strand at a point where the strand is clear of the filter.

46. In combination with a rotary drum-type filter having a filter medium thereupon, a filter cake reenforcing and conveying member comprising a solitary endless flexible strand partly encircling the filter and disposed on the filter medium in the cake forming zone and about which the filter cake forms, means spaced from the filter drum and directing the strand away therefrom with filter cake thereon, and means to separate the cake from the strand at a point where the strand is clear of the filter.

47. In combination with a rotary drum-type filter having a filter medium upon its surface, a filter cake reenforcing and conveying member comprising a solitary flexible strand partly encircling the filter and disposed on the filter medium in the cake forming zone and about which filter cake forms, means spaced from the filter drum directing the strand away from the filter drum with filter cake thereon, means to dry the filter cake on the strand where it is clear of the filter, and means to separate the cake from the strand.

48. In combination with a rotary drum-type filter having a filter medium thereupon, a solitary filter cake reenforcing and conveying member comprising a continuous flexible strand partly encircling the filter and disposed on the filter medium in the cake forming zone and about which the filter cake forms, means spaced from the filter drum directing the strand away from the filter drum with filter cake thereon, means to separate the cake from the strand, and means to direct the strand back to the filter.

49. In a filter cake forming device, in combination, a rotary drum type filter having a filtering medium with compartments beneath the filtering medium and rotating in a tank of liquid containing solids in suspension, a plurality of endless, spaced and substantially parallel unconnected strands partially encircling the filter drum and disposed upon the filtering medium thereof in the zone of filtration, means to maintain sub-atmospheric pressure in said compartments selectively to cause a deposit of the solids upon the filtering medium and the strands whereby said deposit is reenforced by the strands, means spaced from the filter drum to guide the strands away from the drum during a portion of their travel to strip the reenforced deposit from the drum and convey it therefrom, and means spaced from the drum for separating the deposit from the strands.

50. In a filter cake forming device, in combination, a rotary drum type filter having a filtering medium with compartments beneath the filtering medium and rotating in a tank of liquid containing solids in suspension, a plurality of endless spaced and substantially parallel unconnected strands partially encircling the filter drum and disposed upon the filtering medium thereof in the zone of filtration, means to maintain sub-atmospheric pressure in said compartments selectively to cause a deposit of the solids upon the filtering medium and the strands whereby said deposit is reenforced by the strands, means spaced from the filter drum to guide the strands away from the drum during a portion of their travel to strip the reenforced deposit from the drum and convey it therefrom, and a roller spaced from the drum and which said strands partially encircle whereby their direction is changed from that of the deposit for separating the deposit from the strands.

51. The combination of a rotary drum, means carried thereby causing a deposit of solids thereon, a plurality of substantially unconnected endless strands encircling the drum and upon the depositing means, means to introduce the strands into the deposit, means spaced from the drum to conduct the strands with deposit thereon away from the drum and means to separate the deposit from the strands, said means and said strands being relatively movable.

This specification signed this 9th day of June, A. D. 1926.

ARTHUR WRIGHT.
FRANK W. YOUNG.